(12) United States Patent
Modien

(10) Patent No.: US 6,460,521 B1
(45) Date of Patent: Oct. 8, 2002

(54) SOLENOID-ACTUATED EMISSION CONTROL VALVE HAVING A BI-CONICAL POLE PIECE

(75) Inventor: Russell Modien, Chatham (CA)

(73) Assignee: Siemens Automotive Inc., Chatham (CA)

(*) Notice: Subject to any disclaimer, the term of this patent is extended or adjusted under 35 U.S.C. 154(b) by 0 days.

(21) Appl. No.: 09/971,548

(22) Filed: Oct. 5, 2001

(51) Int. Cl.[7] .............................................. F02M 25/07
(52) U.S. Cl. ........................... 123/568.21; 251/129.15; 335/281
(58) Field of Search ................ 123/568.21; 251/129.15; 335/219, 255, 281

(56) References Cited

U.S. PATENT DOCUMENTS

| | | | |
|---|---|---|---|
| 4,515,129 A | * 5/1985 | Stettner | 251/129.15 |
| 5,005,803 A | * 4/1991 | Fritz et al. | 251/129.15 |
| 5,460,146 A | * 10/1995 | Frankenberg | 123/568.21 |
| 5,669,364 A | * 9/1997 | Everingham | 123/568.21 |
| 5,687,698 A | * 11/1997 | Mastro et al. | 251/129.15 |
| 5,779,220 A | * 7/1998 | Nohl et al. | 251/129.15 |
| 5,957,117 A | * 9/1999 | Everingham | 251/129.15 |
| 6,062,536 A | * 5/2000 | Bircann | 251/129.15 |
| 6,247,461 B1 | * 6/2001 | Smith et al. | 123/568.21 |

* cited by examiner

Primary Examiner—Paul J. Hirsch

(57) ABSTRACT

An automotive emission control valve, such as an EGR valve, has a solenoid for operating a valve element. The solenoid has a stator and an armature. A pole piece of the stator is cooperatively associated with a wall of the armature and comprises a channel that is annular about, and concentric with, a centerline of armature motion. In radial cross section the channel is defined by radially inner and outer walls that form an open throat for the channel, allowing an end portion of the armature wall to move within the channel as the armature is displaced along the centerline. Various constructions for the inner and outer walls are disclosed, including tapers for both walls.

23 Claims, 3 Drawing Sheets

SOLENOID-ACTUATED EMISSION CONTROL VALVE HAVING A BI-CONICAL POLE PIECE

FIELD OF THE INVENTION

The invention relates generally to electric-actuated automotive emission control valves, such as exhaust gas recirculation (EGR) valves, and in particular to a solenoid actuator for such emission control valves.

BACKGROUND OF THE INVENTION

An EGR valve may comprise a solenoid as an electric actuator. The solenoid comprises an electromagnet coil and a stator having an air gap at which magnetic flux acts on an armature. The armature motion is transmitted to a valve member to allow flow through a passageway of the valve. Armature motion is resisted by a return spring that acts on the armature, either directly or via the valve member, to bias the armature to a position that causes the valve member to close the passageway.

A known solenoid-actuated EGR valve comprises a stator having an upper pole piece that is disposed at an upper end of the coil and a lower pole piece at the lower end of the coil. The pole pieces have respective annular walls that fit into the open center of the coil, approaching each other from opposite ends of the coil. The juxtaposed ends of the two walls are spaced apart within the open interior of the coil, and their construction and arrangement define an annular air gap disposed circumferentially around the armature. Electric current in the coil creates magnetic flux that passes from one wall across the air gap to the armature, through the armature, and back across the air gap to the other wall. The flux causes magnetic force to be applied to the armature, and the axial component of that force acts to displace the armature along the centerline of the solenoid. Certain changes in coil current will change the magnetic flux spanning the air gap, and possibly also how that flux acts on the armature. Shaping of the interface between each pole piece and the armature is a factor in achieving a desired relationship of armature displacement to coil current.

In an EGR valve, knowledge of the relationship of armature displacement to coil current is essential to a control strategy that accurately meters exhaust gas into the engine intake system.

Accordingly, improvements in the solenoid that would enable desired response to be achieved are seen to be useful, especially as increasingly strict emission regulations become effective, and smaller amounts of exhaust gas need to be metered with increasing precision.

It would also be desirable to provide a basic solenoid construction that can be adapted by designers to create various models of valves possessing desired functional characteristics conforming to various customer specifications.

SUMMARY OF THE PRESENT INVENTION

It is an object of this invention to provide improvements in solenoid actuators, especially those used in smaller automotive emission control valves such as EGR valves, so that more precise control can be achieved.

One general aspect of the invention relates to an mission control valve for controlling flow of gases with respect to combustion chamber space of an internal combustion engine. The valve comprises a valve body comprising a passageway having an inlet port for receiving gases, an outlet port for delivering gases to the combustion chamber space, a valve element that is selectively positioned to selectively restrict the passage, and a mechanism for selectively positioning the valve element. The mechanism comprises a solenoid having an electromagnet coil, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux and that comprises a wall spaced radially from the centerline. The stator comprises a pole piece that is cooperatively associated with the armature wall and that comprises an inner wall disposed radially inward of the armature wall and an outer wall disposed radially outward of the armature wall. One portion of the air gap flux is conducted from the outer wall to the armature wall, another portion of the air gap flux is conducted from the inner wall to the armature wall, and at least one of the pole piece walls has a radial thickness that changes as a function of its location along the centerline.

Another aspect relates to an emission control valve for controlling flow of gases with respect to combustion chamber space of an internal combustion engine. The valve comprises a valve body comprising a passageway having an inlet port for receiving gases, an outlet port for delivering gases to the combustion chamber space, a valve element that is selectively positioned to selectively restrict the passage, and a mechanism for selectively positioning the valve element. The mechanism comprises a solenoid having an electromagnet coil, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux and that comprises an annular wall spaced radially from the centerline. The stator comprises a pole piece that is cooperatively associated with the armature wall and that comprises a channel that is annular about, and concentric with, the centerline and that, in radial cross section, has an open throat that faces the armature and is arranged to allow an end portion of the annular wall of the armature to be disposed within the channel for certain displacements of the armature along the centerline.

A further aspect of the invention relates to a solenoid actuator that comprises a solenoid having an electromagnet coil, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux and that comprises a wall spaced radially from the centerline. The stator comprises a pole piece that is cooperatively associated with the armature wall and that comprises an inner wall disposed radially inward of the armature wall and an outer wall disposed radially outward of the armature wall. One portion of the air gap flux is conducted from the outer wall to the armature wall, another portion of the air gap flux is conducted from the inner wall to the armature wall, and at least one of the pole piece walls has a radial thickness that changes as a function of its location along the centerline.

A still further aspect relates to a solenoid actuator that comprises a solenoid having an electromagnet coil, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux and that comprises an annular wall spaced radially from the centerline. The stator comprises a pole piece that is cooperatively associated with the armature wall and that comprises a channel that is annular about, and concentric with, the centerline and that, in radial cross section, has an open throat that faces the armature and is arranged to allow an end portion of the annular wall of the armature to be disposed within the channel for certain displacements of the armature along the centerline.

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
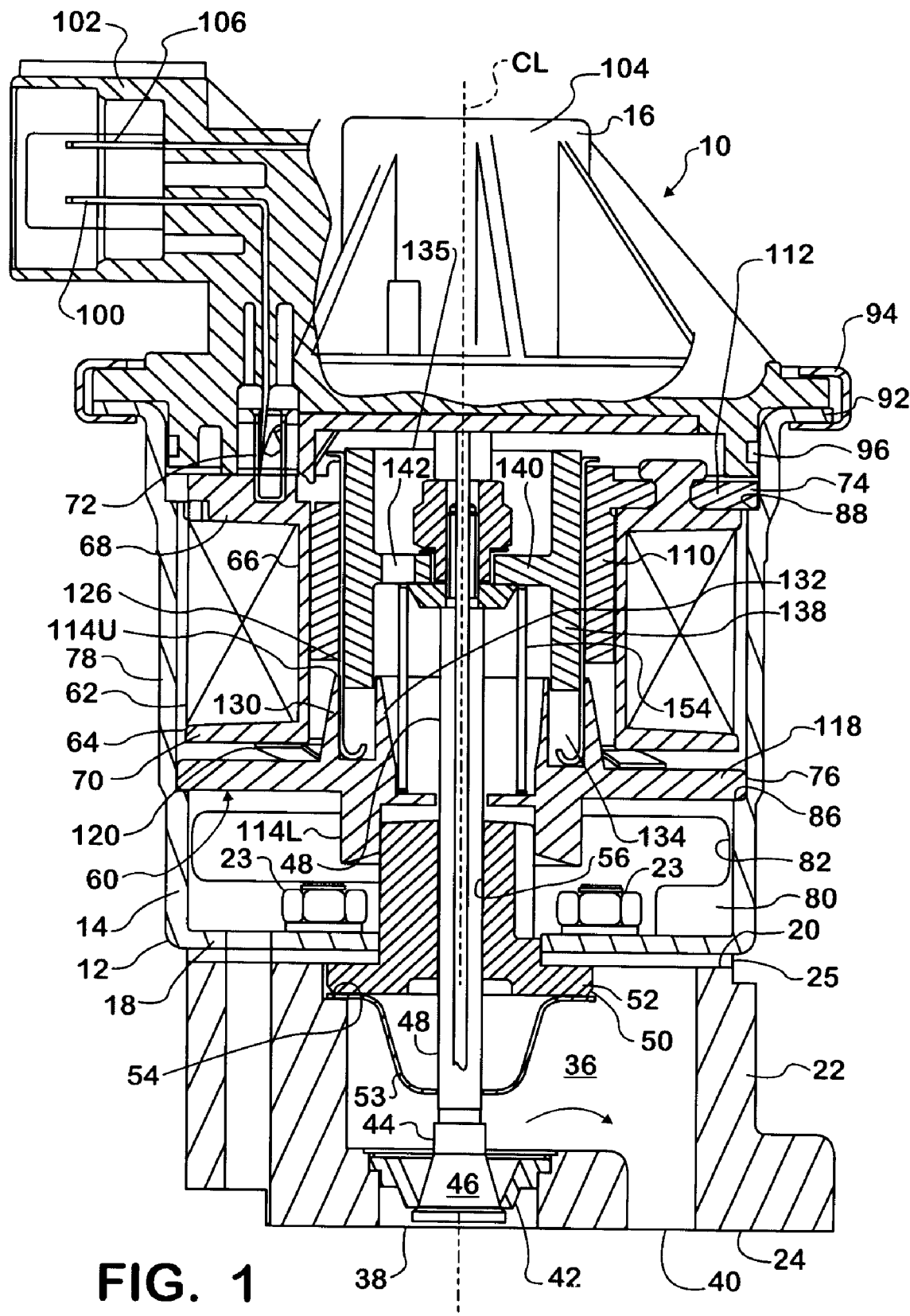
FIG. 1 is a cross section view, in elevation, of an exemplary embodiment of the present invention comprising an emission control valve including a solenoid actuator.

FIG. 1 shows an exemplary EEGR valve 10 that comprises a housing assembly 12 provided by a shell 14 having an open upper end that is closed by a cap 16. Shell 14 further comprises a flat bottom wall 18 that is disposed atop a flat upper surface 20 of a base 22 with an spacer 25 between them. Fasteners 23 secure the shell to the base. Base 22 comprises a flat bottom surface 24 that is adapted to mount on a flat mounting surface of a component of an internal combustion, such as a manifold not specifically shown in the drawing.

Valve 10 comprises a flow passage 36 extending through base 22 between an inlet port 38 and an outlet port 40. With valve 10 mounted on the engine, inlet port 38 is placed in communication with engine exhaust gas expelled from the engine cylinders and outlet port 40 is placed in communication with the intake flow into the cylinders.

A valve seat element 42 is disposed in passage 36 proximate inlet port 38 with the outer perimeter of the seat element sealed to the passage wall. Valve seat 42 has an annular shape comprising a through-hole. A one-piece valve member 44 comprises a valve head 46 and a valve stem 48 extending co-axially from head 46 along an imaginary centerline CL of the valve. Head 46 is shaped for cooperation with seat element 42 to close the through-hole in the seat element when valve 10 is in closed position shown in FIG. 1.

Valve 10 further comprises a bearing member 50 that is basically a circular cylindrical member except for a circular flange 52 at its lower end. An upper rim flange of a multi-shouldered deflector member 53 is axially captured between flange 52 and a shoulder 54 of base 22. Deflector member 53 is a metal part having a clearance hole for stem 48 and a shape that does not restrict exhaust gas flow through passage 36, but at least to some extent deflects the gas away from stem 48 and bearing member 50.

Bearing member 50 further comprises a central circular through-hole, or through-bore, 56 with which stem 48 has a close sliding fit. Bearing member 50 may comprise a material that possesses some degree of lubricity providing for low-friction guidance of valve member 44 along centerline CL.

Valve 10 further comprises an electromagnetic actuator 60, namely a solenoid, disposed within shell 14 coaxial with centerline CL. Actuator 60 comprises an electromagnetic coil 62 and a polymeric bobbin 64. Bobbin 64 comprises a central tubular core 66 and flanges 68, 70 at opposite ends of core 66. Coil 62 comprises a length of magnet wire wound around core 66 between flanges 68, 70. Respective terminations of the magnet wire are joined to respective electric terminals mounted side-by-side on flange 68, only one terminal 72 appearing in the view of FIG. 1.

Actuator 60 comprises stator structure associated with coil 62 to form a portion of a magnetic circuit path. The stator structure comprises an upper pole piece 74, disposed at one end of the actuator coaxial with centerline CL, and a lower pole piece 76 disposed at the opposite end of the actuator coaxial with centerline CL. Shell 14 comprises a side wall 78, a portion of which extends between pole pieces 74, 76 to complete the stator structure exterior of the coil and bobbin.

An annular air circulation space 80 is provided within shell 14 axially below actuator 60. This air space is open to the exterior by several air circulation apertures, or through-openings, 82 extending through shell 14. The shell side wall has a lower ledge 86 on which the outer margin of lower pole piece 76 rests and an upper ledge 88 on which the outer margin of upper pole piece 74 rests. Cap 16 comprises an outer margin that is held secure against a rim 92 at the otherwise open end of the shell side wall by a clinch ring 94. A circular seal 96 is disposed between the cap and shell to make a sealed joint between them.

The radial dimension of shell 14 holds upper pole piece 74 in its axially placed position against ledge 86. Cap 16 comprises a first pair of electric terminals, only one terminal 100 appearing in FIG. 1, that mate respectively with the terminals on bobbin flange 68. The cap terminals protrude externally from the cap material where they are bounded by a surround 102 of the cap material to form a connector adapted for mating connection with a wiring harness connector (not shown) for connecting the actuator to an electric control circuit.

Cap 16 also comprises a tower 104 providing an internal space for a position sensor that comprises plural electric terminals, only one terminal 106 appearing in the Figure, that protrude into the surround for connecting the sensor with a circuit via the mating wiring harness connector.

The construction of valve 10 is such that leakage between passage 36 and air circulation space 80 is prevented. Bearing member through-hole 56 is open to passage 36, but valve stem 48 has a sufficiently close sliding fit therein to substantially occlude the through-hole and prevent leakage between passage 36 and air circulation space 80 while providing low-friction guidance of the stem along centerline CL.

Upper pole piece 74 is a ferromagnetic part that comprises a central, cylindrical-walled, axially-extending hub 110 and a circular radial flange 112 at one end of hub 110. Hub 110 is disposed co-axially within the upper end of a circular through-hole in bobbin core 66 concentric with centerline CL, and flange 112 is disposed against bobbin flange 68, thereby axially and radially relating bobbin 64 and upper pole piece 74. Flange 112 has a clearance slot for bobbin terminals 72.

Lower pole piece 76 is a ferromagnetic part comprising a circular flange 118 that girdles a central hub that has an upper hub portion 114U extending from flange 118 into the bobbin core through-hole, but stopping short of hub 110 and a lower hub portion 114L extending in the opposite direction. An annular wave spring 120 is disposed between flange 118 and bobbin flange 70 for maintaining bobbin flange 68 against flange 112 to compensate for differential thermal expansion.

Figure 2:
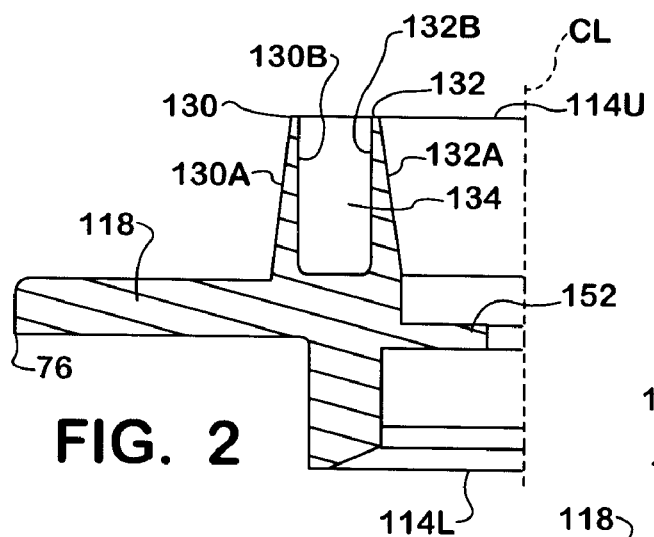
FIG. 2 is a half-section view of a pole piece of the solenoid of FIG. 1 shown by itself.

As shown in FIG. 2, upper hub portion 114U comprises a radially outer annular wall 130 and a radially inner annular wall 132 both of which are concentric with centerline CL. In radial cross section, walls 130 and 132 cooperatively define an integral channel 134 in lower pole piece 76. Channel 134 is annular about, and concentric with, centerline CL, and in radial cross section, has an upwardly open throat. Wall 130 comprises a radially outer face 130A that has a frustoconical taper about centerline CL and a radially inner face 130B that is parallel with centerline CL. Wall 132 comprises a radially inner face 132A that has a frustoconical taper about centerline CL and a radially outer face 132B that is parallel with centerline CL. This gives channel 134 a cross section that is rectangular in shape.

Actuator 60 further comprises a ferromagnetic armature 135 arranged for displacement along centerline CL. Armature displacement is guided in any suitable way, such as by a cylindrical non-ferromagnetic part 126 that axially spans the space between the two pole pieces concentric with centerline CL. Armature 135 cooperates with the stator structure in forming the magnetic circuit of actuator 60.

Armature 135 comprises a circular cylindrical outer wall 138 of suitable radial thickness for the magnetic flux that it conducts. Midway between its opposite ends armature 135 has a transverse wall 140 that serves to provide a point for operative connection of stem 48 to the armature such that motion of the armature along centerline CL is transmitted through stem 48 to position valve head 44 relative to seat element 42, thereby setting the extent to which valve element 44 allows flow through passage 36. The nature of the armature/stem connection compensates for any slight non-concentricity between bearing member 50 and part 126 such that force transmitted from the armature to the stem, and vice versa, is essentially exclusively along centerline CL rather than having a radial component that might undesirably affect the transmission of motion from one to the other. Wall 140 also provides a means for transmitting armature motion to the position sensor housed within tower 104.

The lower pole piece hub comprises a circular through-hole that is concentric with centerline CL and that has an internal shoulder 152. Shoulder 152 enables pole piece 76 to provide a spring seat for one end of a helical coil spring 154 whose other end seats on armature wall 140. The spring acts on armature 135 and valve element 44 to bias valve head 46 toward seating closed on seat element 42.

FIG. 1 shows the closed position of valve 10 wherein spring 154 is pre-loaded, forcing valve head 46 to seat on seat element 42, closing passage 36 to flow between ports 38 and 40. As electric current begins to increasingly flow through coil 62, the magnetic circuit exerts increasing force urging armature 135 in the downward direction as viewed in FIG. 1. Once the force is large enough to overcome the bias of the pre-load force of spring 154, armature 135 begins to move downward, similarly moving valve element 44 and opening valve 10 to allow flow through passage 36 between the two ports. The extent to which the valve is allowed to open is controlled by the electric current in coil 62, and by tracking the extent of valve motion, the position sensor can provide a feedback signal representing valve position, and hence the extent of valve opening. The actual control strategy for the valve is determined as part of the overall engine control strategy embodied by an associated electronic engine control. One or more through-holes 142 that extend through wall 140 provide for the equalization of air pressure at opposite axial ends of the armature.

In accordance with principles of the invention, the lower end portion of armature wall 138 cooperatively associates with channel 134. The juxtaposed faces 130B, 132B of the two walls 130, 132 are spaced apart sufficiently to allow armature wall 138 to be disposed between them. With actuator 60 not electrically energized, wall 138 just slightly enters channel 134. As actuator 60 is increasingly energized to increasingly displace armature 135 downward and open the valve, wall 138 increasingly enters channel 134. Part 126 extends into channel 134 to assure magnetic separation of the radially outer face of wall 138 from face 130B, and the radial thickness of wall 138 is small enough to assure that its radially inner face does not short out against face 132B.

The shapes of walls 130, 132 determine the pattern of magnetic flux passing across the interface between wall 138 and pole piece 76 and hence functionally relates the magnetic force acting on armature 135 to the electric current in coil 62. At least one of the walls 130, 132 that has a radial thickness that changes as a function of its location along centerline CL. In the particular embodiment shown in FIGS. 1 and 2, both walls have linear tapers that cause the radial thickness of each wall to progressively decrease along centerline CL in the direction of upper pole piece 74. This makes the pole piece bi-conical. In radial cross section, each wall appears as the mirror image of the other. Linear taper is imparted to wall 130 by making face 130A frustoconical to centerline CL while face 130B is parallel to centerline CL. Linear taper is imparted to wall 132 by making face 132A frustoconical to centerline CL while face 130B is parallel to centerline CL.

Figure 6:
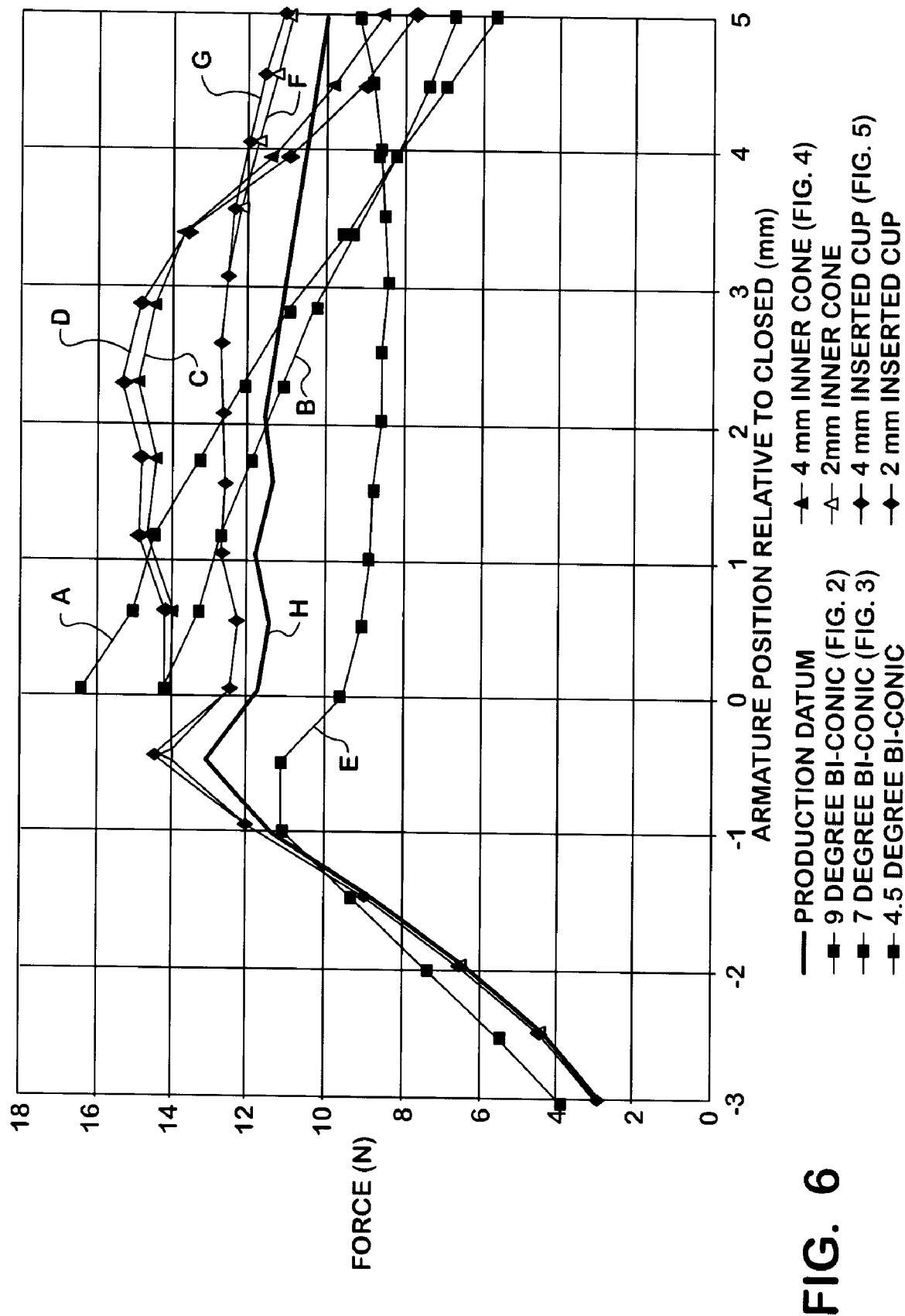
FIG. 6 is graph plot illustrating representative characteristic traces of force vs. armature displacement for solenoids embodying the various pole pieces.

By providing one pole piece with two walls for conducting magnetic flux to inner and outer faces of the armature wall concurrent with the ability to shape each wall independent of the other, it is believed that solenoid and valve designers will have the ability to create many different force vs. displacement characteristics in solenoids and valves. Some examples that are considered possible are shown by the traces in the graph plot of FIG. 6.

Each trace plots armature force as a function of armature displacement for a constant current in coil 62. Zero armature displacement represents the closed position of the valve. Positive armature displacements open the valve while negative armature displacements are plotted for reference. The legend accompanying the plot correlates each trace with a particular pole piece. Trace A is a characteristic for a solenoid having a lower pole piece like the one that has been described in FIGS. 1 and 2. Trace B is a characteristic for a solenoid having a lower pole piece like the one shown in FIG. 3. Trace C is a characteristic for a solenoid having a lower pole piece like the one shown in FIG. 4. Trace D is a characteristic for a solenoid having a lower pole piece like the one shown in FIG. 5.

Figure 3:
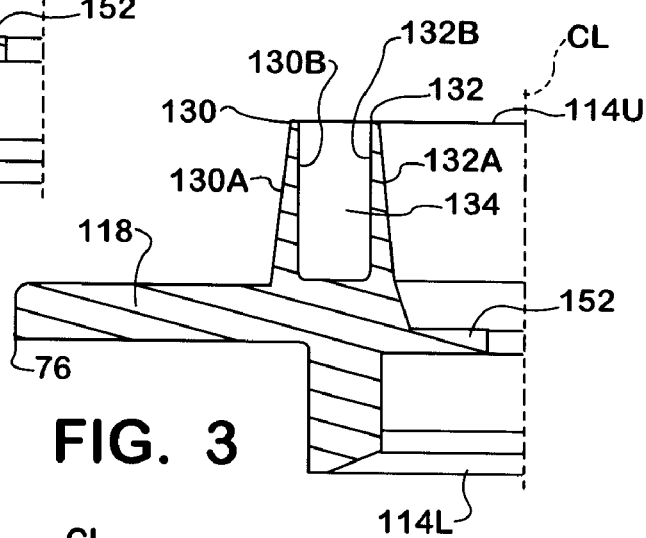
FIGS. 3, 4, and 5 are respective half-section views of other embodiments of the pole piece.
Figure 4:
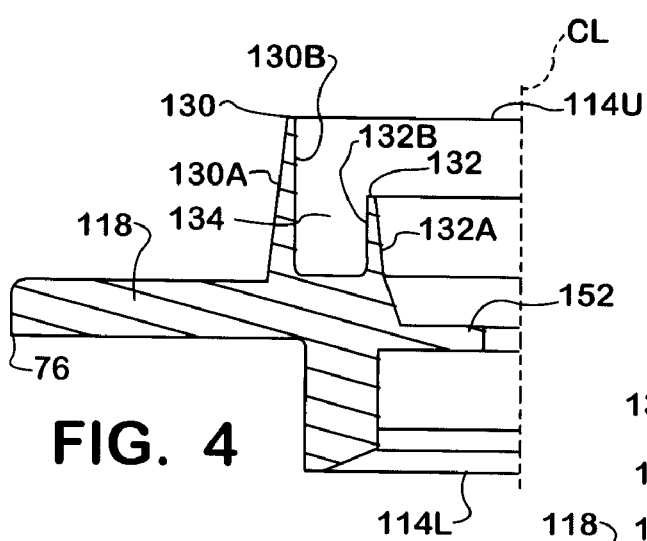
Figure 5:
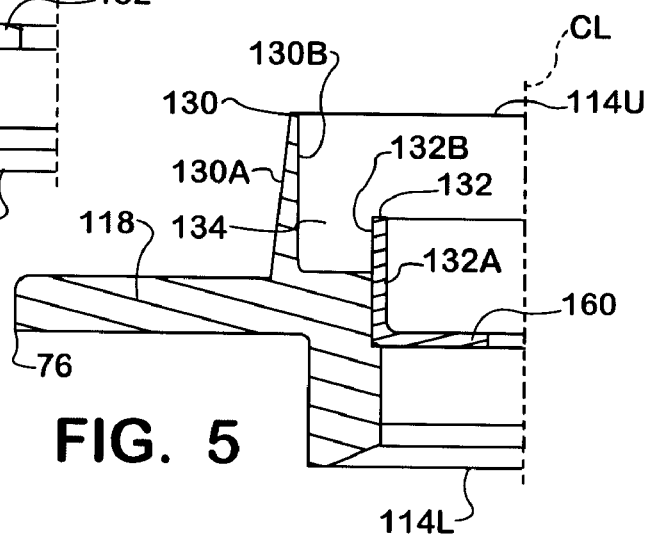

In each FIGS. 3, 4, and 5, the same reference numerals as in FIGS. 1 and 2 mark the same walls and faces.

The pole piece of FIG. 3 differs from that of FIG. 2 in that walls 130, 132 are narrower, i.e. more sharply tapered, and the extension of face 132A to shoulder 152 is tapered.

The pole piece of FIG. 4 has a wall 130 like that of FIG. 2 but its wall 132 is shorter. The extension of face 132A to shoulder 152 is tapered.

In the pole piece of FIG. 5, wall 132 is provided by a separate ferromagnetic part 160 that is fit to the part containing wall 130.

Trace E represents a characteristic for a solenoid having a pole piece like that of FIG. 3, but with an even sharper taper. Trace F represents a characteristic for a solenoid having a pole piece like that of FIG. 4, but with an even shorter inner wall. Trace G represents a characteristic for a solenoid having a pole piece like that of FIG. 5, but with a smaller thickness. Trace H represents a baseline reference where the valve solenoid comprises a lower pole piece having a single tapered wall.

While the foregoing has described a preferred embodiment of the present invention, it is to be appreciated that the inventive principles may be practiced in any form that falls within the scope of the following claims.

What is claimed is:

1. An emission control valve for controlling flow of gases with respect to combustion chamber space of an internal combustion engine comprising:
   a valve body comprising a passageway having an inlet port for receiving gases and an outlet port for delivering gases to the combustion chamber space,
   a valve element that is selectively positioned to selectively restrict the passage,
   and a mechanism for selectively positioning the valve element comprising a solenoid having an electromagnet coil, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux and that comprises a wall spaced radially from the centerline, and
   wherein the stator comprises a pole piece that is cooperatively associated with the armature wall and that comprises an inner wall disposed radially inward of the armature wall and an outer wall disposed radially outward of the armature wall, one portion of the air gap flux is conducted from the outer wall to the armature wall, another portion of the air gap flux is conducted from the inner wall to the armature wall, and at least one of the pole piece walls has a radial thickness that changes as a function of its location along the centerline.

2. An emission control valve as set forth in claim 1 wherein the armature wall and the pole piece walls are annular about the centerline.

3. An emission control valve as set forth in claim 2 wherein the pole piece walls have juxtaposed faces that are spaced apart sufficiently to allow the armature wall to be disposed between them for certain displacements of the armature.

4. An emission control valve as set forth in claim 1 wherein the at least one of the pole piece walls that has a radial thickness that changes as a function of its location along the centerline has a radial thickness that tapers along the centerline.

5. An emission control valve as set forth in claim 4 wherein a radially outer surface of the at least one of the pole piece walls tapers along the centerline.

6. An emission control valve as set forth in claim 4 wherein a radially inner surface of the at least one of the pole piece walls tapers along the centerline.

7. An emission control valve as set forth in claim 4 wherein the at least one of the pole piece walls has a radial thickness that has a linear taper along the centerline.

8. An emission control valve as set forth in claim 4 wherein each pole piece wall has a radial thickness that tapers along the centerline.

9. An emission control valve as set forth in claim 8 wherein the inner wall has a radially outer face that is parallel to the centerline and a radially inner face that is frustoconical to the centerline, and the outer wall has a radially inner face that is parallel to the centerline and a radially outer face that is frustoconical to the centerline.

10. An emission control valve as set forth in claim 8 wherein the radially outer face of the inner wall and the radially inner face of the outer wall are disposed in juxtaposition and are spaced radially apart a sufficient distance to allow the armature wall to be disposed between them for certain displacements of the armature.

11. An emission control valve as set forth in claim 10 wherein the armature wall comprises radially inner and radially outer faces, each of which is parallel to the centerline, with the radially inner face of the armature wall assuming juxtaposition to the radially outer face of the inner wall and the radially outer face of the armature wall assuming juxtaposition to the radially inner face of the outer wall when the armature wall is disposed between the inner wall and the outer wall.

12. An emission control valve as set forth in claim 1 wherein the pole piece comprises a single piece of ferromagnetic material containing both inner and outer walls.

13. An emission control valve as set forth in claim 1 wherein the pole piece comprises a first piece of ferromagnetic material containing one of the inner and outer walls and a second piece of ferromagnetic material containing the other of the inner and outer walls, the first and second pieces being fit to each other.

14. An emission control valve for controlling flow of gases with respect to combustion chamber space of an internal combustion engine comprising:
    a valve body comprising a passageway having an inlet port for receiving gases and an outlet port for delivering gases to the combustion chamber space,
    a valve element that is selectively positioned to selectively restrict the passage,
    and a mechanism for selectively positioning the valve element comprising a solenoid having an electromagnet coil, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux and that comprises an annular wall spaced radially from the centerline, and
    wherein the stator comprises a pole piece that is cooperatively associated with the armature wall and that comprises a channel that is annular about, and concentric with, the centerline and that, in radial cross section, has an open throat that faces the armature and is arranged to allow an end portion of the annular wall of the armature to be disposed within the channel for certain displacements of the armature along the centerline.

15. An emission control valve as set forth in claim 14 wherein the pole piece comprises an outer wall and an inner wall that radially bound the channel, at least one of the pole piece walls having a radial thickness that changes as a function of its location along the centerline.

16. An emission control valve as set forth in claim 15 wherein the at least one of the pole piece walls that has a radial thickness that changes as a function of its location along the centerline has a radial thickness that tapers along the centerline.

17. An emission control valve as set forth in claim 16 wherein a radially outer face of the at least one of the pole piece walls tapers along the centerline.

18. An emission control valve as set forth in claim 16 wherein a radially inner face of the at least one of the pole piece walls tapers along the centerline.

19. An emission control valve as set forth in claim 15 wherein the at least one of the pole piece walls has a radial thickness that has a linear taper along the centerline.

20. An emission control valve as set forth in claim 15 wherein each pole piece wall has a radial thickness that tapers along the centerline.

21. An emission control valve as set forth in claim 20 wherein the inner wall has a radially outer face that is parallel to the centerline and a radially inner face that is frustoconical to the centerline, and the outer wall has a radially inner face that is parallel to the centerline and a radially outer face that is frustoconical to the centerline.

22. An emission control valve as set forth in claim 14 wherein the pole piece comprises a single piece of ferromagnetic material containing both inner and outer walls.

23. An emission control valve as set forth in claim 14 wherein the pole piece comprises a first piece of ferromagnetic material containing one of the inner and outer walls and a second piece of ferromagnetic material containing the other of the inner and outer walls, the first and second pieces being fit to each other.

* * * * *